United States Patent [19]
Schoen et al.

[11] Patent Number: 5,429,412
[45] Date of Patent: Jul. 4, 1995

[54] PLASTIC FENDER RETAINER ARRANGEMENT

[75] Inventors: Robert M. Schoen, West Bloomfield; Peter D. Greb, Farmington Hills; Rickie A. North, Fenton, all of Mich.

[73] Assignee: Chrysler Corporation, Highland Park, Mich.

[21] Appl. No.: 112,021

[22] Filed: Aug. 26, 1993

[51] Int. Cl.⁶ .............................................. B62D 25/16
[52] U.S. Cl. ................................... 296/187; 296/191; 296/198; 296/901; 52/573.1; 52/582.1
[58] Field of Search .................. 296/29, 187, 191, 198, 296/901; 52/573.1, 582.1

[56] References Cited

U.S. PATENT DOCUMENTS

| | | | |
|---|---|---|---|
| 4,573,733 | 3/1986 | Zaydel | 296/191 |
| 4,973,102 | 11/1990 | Bien | 296/187 |
| 5,061,108 | 11/1991 | Bien | 403/24 |
| 5,098,765 | 3/1992 | Bien | 296/191 X |
| 5,297,845 | 3/1994 | Smartt et al. | 296/191 |

Primary Examiner—Dennis H. Pedder
Attorney, Agent, or Firm—Edward P. Barthel

[57] ABSTRACT

A clip and bracket fastening arrangement for attaching a free end portion of a plastic facia fender panel member support wall to a subjacent rail of an automotive vehicle frame enabling controlled distortion free thermal expansion and contraction of the support wall relative to the metal frame. An attaching arrangement elongated retaining clip is fixed to the outboard surface of the support wall and the bracket adjustably mounted on the frame. The retaining clip, stamped from sheet metal, comprises an elongated web defining a clearance slot with the support wall. The bracket is double-L shaped defining a vertical head plate provided with a lower inboard extending base plate and an upper outboard extending step flange. The bracket is captured in a clearance slot defined by the clip web portion offset a predetermined dimension from the support wall outboard facing surface.

7 Claims, 2 Drawing Sheets

PLASTIC FENDER RETAINER ARRANGEMENT

BACKGROUND OF THE INVENTION

This invention relates to automobile body structures and, more particularly, to an arrangement for retaining a free end portion of vehicle plastic body panel to a subjacent metal portion of the vehicle frame.

Various fastening arrangements have been used to secure flexible elastomeric vehicle body panels to a subjacent connector member. One arrangement for mounting a plastic fender panel is shown and described in U.S. Pat. No. 5,061,108 issued Oct. 29, 1991 to Bien et al. and assigned to the assignee of the present application. The Bien patent discloses one or more female connectors integrally formed on a fender panel engaging associated male connectors projecting from a supporting surface. One of the problems associated with such flexible plastic panel assemblies is to achieve front corner dimensional stability during heat cycling and design service life.

The U.S. Pat. No. 5,098,765 issued Mar. 24, 1992 to Bien, also assigned to the assignee of the present application, discloses another arrangement for attaching a plastic panel to an automotive body metal substructure enabling controlled distortion free thermal expansion and contraction of the panel relative to the vehicle frame. The '765 Bien patent concerns a plurality of self-adjusting plastic mounting blocks sized for initial insertion in a wide slot portion of an associated keyhole shaped expansion and contraction slot provided in the vehicle metal frame. The blocks are uniquely designed to enable the plastic panel and the blocks to slid relative to the metal frame thereby accommodating thermal movement of the panel.

The U.S. Pat. No. 4,573,733 issued Mar. 4, 1986 to Zaydel discloses an apparatus for mounting a vehicle plastic body panel upon an underlying metal substructure wherein one end of the panel is fixedly mounted on the substructure. The thermal growth of the panel induces longitudinal movement of a mounting member to permit distortion-free growth relative to the underlying metal substructure.

SUMMARY OF THE INVENTION

It is an object of the present invention to provide a clip and bracket retaining arrangement adapted for pre-assembly line attachment on a vehicle plastic panel sub-assembly for subsequent mounting on the vehicle metal frame substructure enabling adjustment of the panel to accommodate production dimensional tolerances providing a satisfactory appearance while also accommodating distortion free thermal growth of the panel relative to the underlying substructure.

It is another object of the present invention to provide a clip and bracket retaining arrangement for plastic panels as set forth above requiring a minimum of attaching hardware or support structure.

It is still another object of the present invention to provide a clip and bracket retaining arrangement for plastic panels as set forth above wherein both the clip and bracket are covered by the exterior panel and not visible while being economically formed by stamping from light weight sheet metal.

BRIEF DESCRIPTION OF THE DRAWINGS

These and other objects, features and advantages of the invention will appear from the following written description and the accompanying drawings in which.

DETAILED DESCRIPTION OF THE INVENTION

Figure 1:
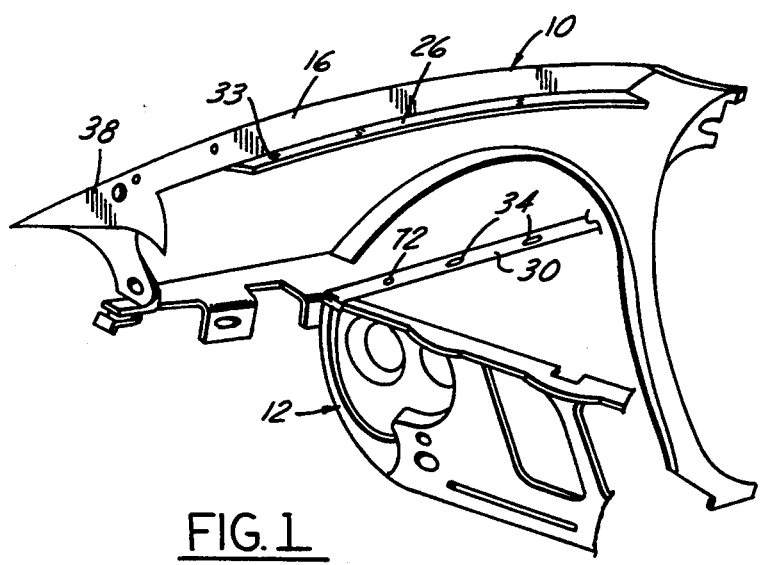
FIG. 1 is a fragmentary perspective view of a vehicle front fender and the vehicle body structure to which the fender is secured.

Referring now to the drawings and in particular to FIG. 1, there is shown a perspective view of a vehicle body exterior panel component such as a fender, generally indicated at 10, adapted for mounting on a vehicle substructure metal frame 12. In the preferred embodiment, the right hand fender panel 10 is formed of elastomeric or composite plastic sheet material. Reference may be made to the above mentioned '108 and '765 patents for a detailed description of existing means for attaching a plastic fender to a vehicle.

Figure 2:
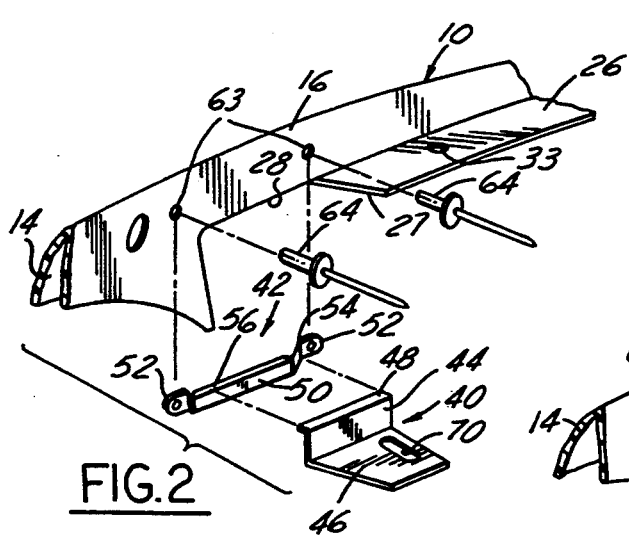
FIG. 2 is a fragmentary exploded perspective view of a fender integral support panel and the fastening arrangement of the present invention.

As seen in FIG. 2, the fender panel 10 comprises an exterior fascia panel portion 14 and a vertically disposed inboard planer integral support wall portion 16. It will be noted in FIG. 5 that the panel portion 14 has an exterior convex surface 18 and an interior concave surface 20. The support wall portion 16 has a hidden outboard surface 22 and an inboard surface 24. FIG. 1 shows the fender panel inboard wall portion 16 terminating at its lower end in an inboard extending horizontal stiffener or shelf flange 26. It will be noted that the shelf flange 26 terminates at its forward end in a transverse edge 27. The support wall has an under-cut horizontally disposed free edge 28 (FIG. 6) spaced a predetermined dimension above a frame rail 30.

Figure 3A:
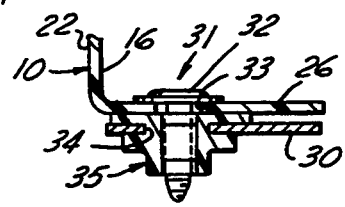
FIG. 3A is a fragmentary transverse vertical sectional view taken on the line 3A—3A of FIG. 3.
Figure 3:
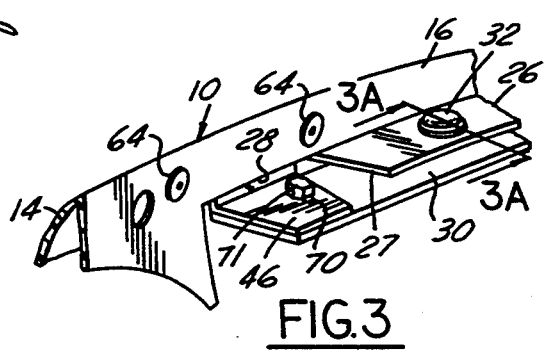
FIG. 3 is a fragmentary perspective view of the interior vertical surface of the fender support panel with the fastening arrangement secured thereto.

It will be seen in FIG. 3 that the shelf flange 26 is supported in a flush manner on the longitudinally extending body metal substructure frame rail 30. With reference to FIGS. 3 and 3A, it will be seen that a slidable block attaching arrangement 31 comprises a self-tapping threaded screw fastener 32 which extends through an adjustable fastening hole 33 (FIG. 2) and an aligned keyhole-shaped slot 34 (FIG. 1) in the frame rail 30. As seen in FIG. 3A, the screw 32 engages a plastic block 35 slidably mounted in the keyhole-shaped slot 34 enabling the plastic fender 10 and its associated blocks 35 to slide fore and aft relative to the frame rail 30 accommodating longitudinal thermal movement of the fender panel and shelf flange 26. Reference should be made to the above mentioned '765 Bien patent, the disclosure of which is incorporated by reference herein, for a detailed description of the attaching arrangement 31.

The clip and bracket retaining arrangement of the present invention, which uniquely provides three degrees of adjustability of the panel forward cantilevered portion 38; i.e., transverse, longitudinal and vertical, comprises an angle bracket 40 and a strap-like retaining clip 42. It will be noted that both the bracket 40 and the clip 42 are each preferably fabricated as one-piece members from suitable sheet metal material.

Figure 6A:
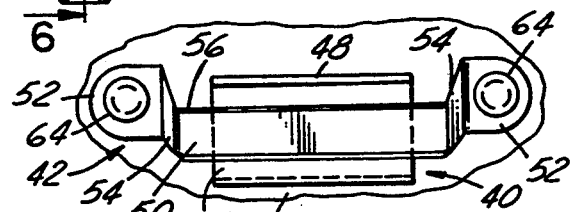
FIG. 6A is a fragmentary side view taken on the line 6A—6A of FIG. 6.
Figure 6:
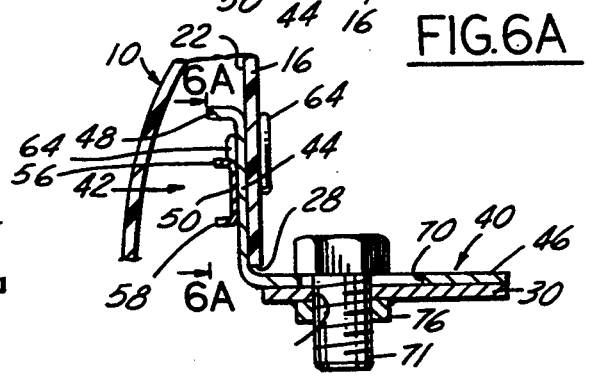
FIG. 6 is a fragmentary vertical sectional view taken on the line 6—6 of FIG. 4.

As best seen in FIGS. 1 and 6, the right hand angle bracket 40 is a "handed" part designed for use with the right hand fender panel 10. Accordingly, a left hand bracket (not shown) is formed as a mirror image of the bracket 40. The bracket 40 has a double-L shape in vertical transverse section defining a vertically upstanding riser head plate portion 44 formed with a lower inboard extending horizontal base plate 46 and an upper outboard extending step flange 48 parallel to the base plate 46. It will be seen in FIG. 6 that the base plate 46 is adapted for transverse slidable adjustment relative to the vehicle substructure upon being supported in a flush manner on the upper surface of the frame rail 30.

Figure 8:
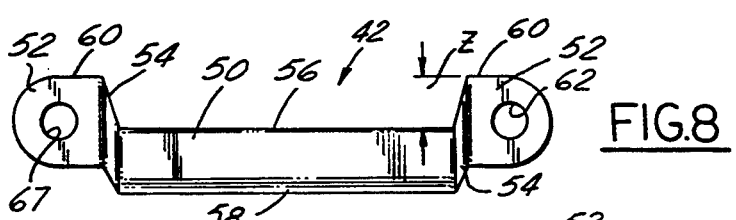
FIG. 8 is detail side view of the panel strap member shown in the fastening arrangement of FIG. 2.
Figure 9:
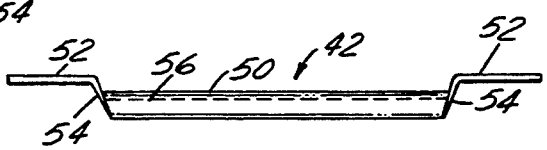
FIG. 9 is a detail top view of the panel strap member of FIG. 8.
Figure 4:
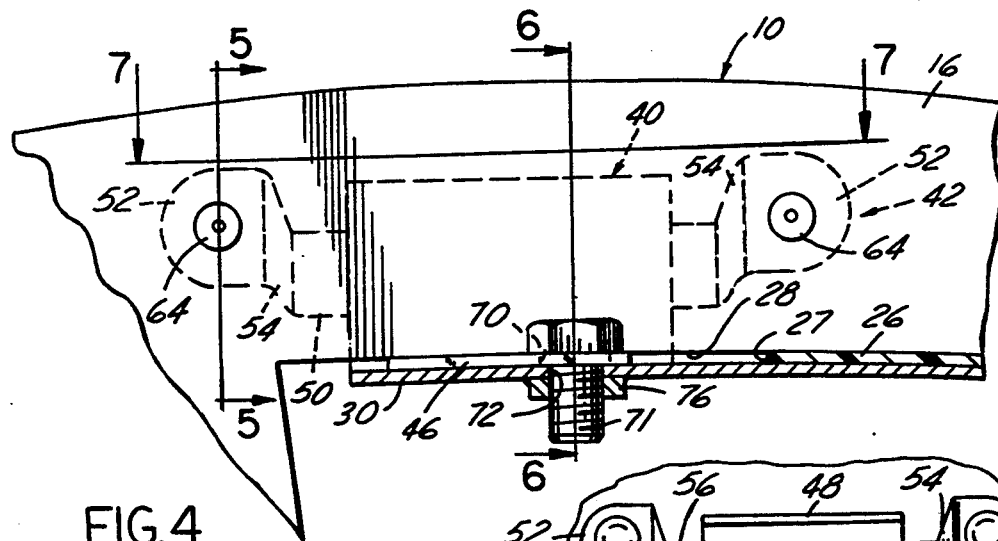
FIG. 4 is a fragmentary interior side view showing the fender support panel portion secured to the vehicle substructure by means of the fastening arrangement of the present invention.

With reference to FIG. 8 and 9, the retaining clip 42 is generally U-shaped when viewed in horizontal cross-section. The clip comprises an elongated horizontally disposed longitudinally extending planar web portion 50 terminating at each end in a pair of mirror image mounting feet 52. The feet 52 are off-set inboard in a parallel manner from the plane of the web 50 by a pair of legs 54 bent from the ends of the web such that the web and legs define an elongated slotted clearance passage 55 (FIG. 7) of predetermined extent. The web 50 is spaced a predetermined dimension from the outboard surface 22 of the support wall 16 slightly greater than the thickness of the bracket head plate 44. As seen in FIG. 6, the web 50 is channel-shaped in vertical section providing upper 56 and lower 58 outboard extending rail flanges.

It will be noted in FIG. 9 that the bent support legs 54 are angled upwardly from the web 50 such that the feet 52 are vertically off-set from the web. As a result, the upper web flange 56 is vertically spaced a predetermined dimension "Z" below the upper edges 60 of the clip feet 52 for a reason to be explained. A mounting hole 62 is provided in each clip foot 52 whereby the pair of holes 62 aligned with an associated wall apertures 63 (FIG. 5) for receiving therethrough suitable fasteners such as pop rivets 64.

Figure 5:
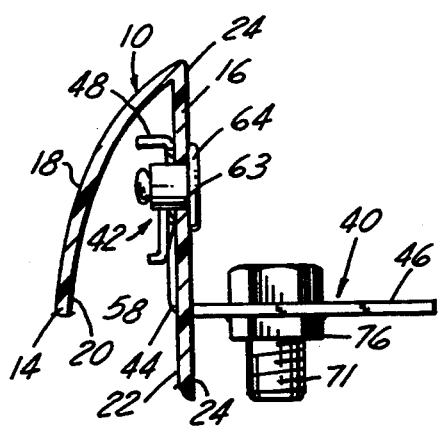
FIG. 5 is a fragmentary vertical sectional view taken on the line 5—5 of FIG. 4.

As best seen in FIG. 5, it will be noted that applicant's novel bracket 40 and clip 42 assembly are adapted for installation on the fender panel support wall 16 as a subassembly prior to the fender panel being mounted on the vehicle body substructure during an assembly line operation. Thus, with the bracket head plate 44 located in flush or flatwise engagement with the support wall outboard surface 22 the clip web 50 is vertically spaced intermediate the bracket lip flange 48 and its base plate 46. It will be appreciated from FIGS. 5 and 6A that, upon the rivets 64 being secured in the aligned clip foot holes 62 and associated support wall apertures 63, the bracket head plate 44 is captured in the slotted passage 55 in an interlocked manner providing a panel 10, bracket 40, and clip 42 sub-assembly. In the sub-assembly mode, the bracket 40 is free for limited sliding longitudinal and vertical adjustable movement relative to the support wall in the plane thereof.

Figure 7:
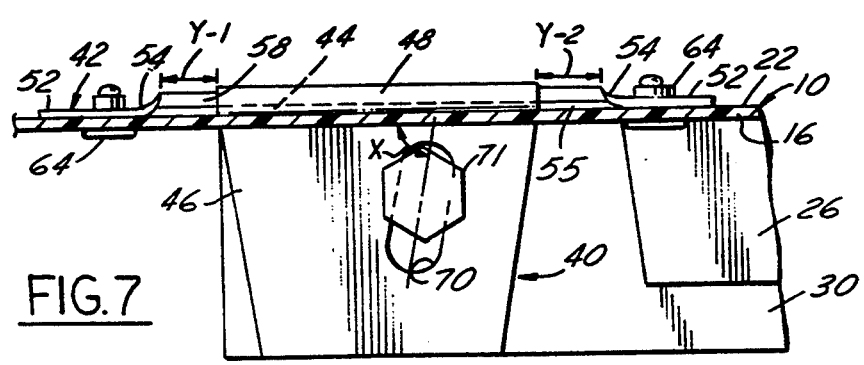
FIG. 7 is a fragmentary horizontal sectional view taken on the line 7—7 of FIG. 4.

It will be seen in FIG. 3 that in its interlocked position the bracket head plate 44 is sized for slidable travel in the clip slotted clearance passage 55 in flush contact with outboard surface 22 of the support wall. The base plate 46 is shown extending inboard for flatwise contact with the upper surface of the frame rail 30. FIG. 2 shows the base plate 46 having an elongated aperture for transverse adjustment of the bracket and fender panel. As best seen in FIG. 7, the elongated aperture in the instant embodiment is in the form of an adjustment slot 70 having its principal axis "A" obliquely oriented at an acute angle "X" to the vehicle longitudinal axis. In the disclosed form, the angle "X" is or the order of eighty degrees from the vehicle longitudinal axis.

A bolt 71 is adapted for reception in the bracket slot 70 and in an aligned hole 72 in the frame rail 30 to providing, prior to final tightening of a nut 76 on bolt 71, a laterally selectively adjustable connection between the bracket 40 and the vehicle frame rail 30. Upon the leading portion of the fender panel being correctly positioned on the body, the nut 76 is torqued down to positively secure the bracket 40 on the frame rail.

As discussed in the above mentioned '765 and '108 patents, the fender panel 10 is adapted for ready assembly line installation upon attachment the panel shelf flange 26 to the frame rail 30 by a plurality of longitudinally slidable intermediate attaching arrangements, such as the arrangement 31 shown in FIG. 3A, for example. Thereafter, the bracket 40 and clip 42 adjustable forward fastening arrangement of the present invention is secured as described above. It will be appreciated that applicants' attaching arrangement allows limited adjustment travel in three degrees the forward most cantilevered fender portion 80 together with of the fender panel 10 and its U-shaped clip 42 freedom for limited three degrees of travel; i.e., forward and aft along a longitudinal axis for reciprocal slidable movement predetermined forward "Y-1" and aft "Y-2" distances.

In the disclosed embodiment, upon the fender panel being secured to the rail 30 by the FIG. 3A attaching arrangement 31, but prior to the final tightening of the nut 76, leading cantilevered portion of the flexible plastic fender panel 10 is urged inboard relative to the frame substructure to its designed position. To allow for thermal growth the fender panel wall 16 by virtue of the clip 42 defined slotted passage 55 guided longitudinal travel relative to the bracket head plate 44.

With reference to FIG. 6A, it will be seen that by having the web 50 offset downwardly a dimension "Z" (FIG. 8) the upper lip flange 48 is vertically positioned in its design mode intermediate the web upper flange 56 and the upper edges of the clip feet 52. It will be noted in FIG. 6 that the internal clearance space between the support wall 16 and the inwardly curving facia panel 14 narrows toward their upper juncture. Thus, Applicants' downwardly offset web 50 compensates by lowering the neutral design position of the step flange 48 relative to the upper juncture.

While the principles of the present invention in connection with the specific test device has been described, it is to be understood the foregoing detailed description has been made by way of example only and not as a limitation to the scope of the invention as set for in the accompanying claims.

What is claimed is:

1. A clip and bracket retainer arrangement for securing an exterior plastic panel, having an integral vertically disposed support wall defining inboard and outboard surfaces, to an automotive vehicle subjacent frame, the panel and frame being constructed of materials having substantially dissimilar rates of thermal expansion whereby the retainer arrangement allows thermal growth of the panel relative to the frame, the retainer arrangement comprising:

a clip having a U-shape when viewed in horizontal section comprising a longitudinally elongated web positioned with an inboard surface in a vertically extending plane offset from the support wall outboard surface, said web having a foot portion formed at each opposite end, and fastener means fixedly securing each said foot portion to the support wall, whereby said web inboard surface and the support wall outboard surface defining a slotted clearance therebetween having a predetermined longitudinal extent;

an L-section bracket defined by a vertically extending head plate terminating at its lower end in an inboard extending base plate, said head plate having a predetermined longitudinal dimension less than said slotted clearance extent whereby said clip foot portions straddle said head plate, said head plate formed with integral means operative for capturing said head plate in said slotted clearance providing limited longitudinal and vertical movement of said clip and panel relative to said bracket head plate accommodating thermal growth of the panel; and a threaded fastener adjustably securing said bracket base plate on the vehicle subjacent frame permitting, prior to final tightening of the fastener, limited inboard and outboard movement of the panel relative to the subjacent frame.

2. The clip and bracket retainer arrangement as set forth in claim 1 wherein said bracket and said clip are each one-piece members formed from sheet metal.

3. The clip and bracket retainer arrangement as set forth in claim 1 wherein said bracket base plate threaded fastener passing through an elongated adjustment slot in said base plate and an aligned hole in the frame.

4. The clip and bracket retainer arrangement as set forth in claim 3 wherein said slot principal axis defines an acute angel with a longitudinal axis of the vehicle body.

5. The clip and bracket retainer arrangement as set forth in claim 1 wherein said head plate integral means is in the form of a horizontally disposed step flange extending outboard from an upper edge of said head plate.

6. The clip and bracket retainer arrangement as set forth in claim 1 wherein said clip foot fastener means are rivets.

7. The clip and bracket retainer arrangement as set forth in claim 5 wherein said clip web is offset downwardly a predetermined dimension from an upper horizontal terminal edge of each of said clip foot portions, whereby said bracket head plate step flange is able to be vertically located below said upper horizontal terminal edge of said clip foot portions.

* * * * *